United States Patent
Wang

(10) Patent No.: US 10,725,760 B2
(45) Date of Patent: Jul. 28, 2020

(54) APPLICATION PROGRAM UNINSTALLATION METHOD AND APPARATUS

(71) Applicant: Huawei Technologies Co., Ltd., Shenzhen (CN)

(72) Inventor: Xiangyang Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/539,601

(22) PCT Filed: Dec. 18, 2015

(86) PCT No.: PCT/CN2015/097904
§ 371 (c)(1),
(2) Date: Jun. 23, 2017

(87) PCT Pub. No.: WO2016/101843
PCT Pub. Date: Jun. 30, 2016

(65) Prior Publication Data
US 2017/0364344 A1    Dec. 21, 2017

(30) Foreign Application Priority Data
Dec. 25, 2014  (CN) .......................... 2014 1 0828762

(51) Int. Cl.
*G06F 9/44* (2018.01)
*G06F 8/61* (2018.01)
(Continued)

(52) U.S. Cl.
CPC ............... *G06F 8/62* (2013.01); *G06F 16/29* (2019.01); *H04W 4/023* (2013.01); *H04W 88/02* (2013.01)

(58) Field of Classification Search
CPC .................................. G06F 9/44; G06F 15/16
See application file for complete search history.

(56) References Cited

U.S. PATENT DOCUMENTS

2008/0153540 A1    6/2008  Brown
2009/0063624 A1    3/2009  Nordstrom et al.
(Continued)

FOREIGN PATENT DOCUMENTS

CN    101515238 A    8/2009
CN    101796803 A    8/2010
(Continued)

OTHER PUBLICATIONS

K. Wallace and B. Schwoerer, "Concept for automatic reporting of Global Positioning System radio frequency interference," 19th DASC. 19th Digital Avionics Systems Conference. Proceedings (Cat. No. 00CH37126), Philadelphia, PA, USA, 2000, pp. 3C1/1-3C1/8 vol. 1. (Year: 2000).*

*Primary Examiner* — Hanh Thi-Minh Bui
(74) *Attorney, Agent, or Firm* — Leydig, Voit & Mayer, Ltd.

(57) ABSTRACT

An application program uninstallation method and apparatus relate to the field of communications technologies. The method includes: obtaining current location information of a terminal (101); obtaining effective location information of a first application that is already installed on the terminal, where the effective location information is used for instructing the first application to provide an effective application service when the terminal is within a geographical location range corresponding to the effective location information (102); and uninstalling, by the terminal, the first application when the current location information of the terminal does not match the effective location information of the first application (103). According to the method and the apparatus, an application program is uninstalled when a current location of a terminal does not match an effective geographical location of the application program, so that user opera- (Continued)

tion and control efficiency and terminal usability are improved, and user experience is improved.

10 Claims, 5 Drawing Sheets

(51) Int. Cl.
*G06F 16/29* (2019.01)
*H04W 4/02* (2018.01)
*H04W 88/02* (2009.01)

(56) References Cited

U.S. PATENT DOCUMENTS

| 2013/0339937 | A1 | 12/2013 | Meggison, Sr. et al. |
| 2014/0149582 | A1 | 5/2014 | Chien |
| 2015/0163634 | A1* | 6/2015 | Meredith ............. H04W 4/023 455/456.6 |
| 2016/0328225 | A1* | 11/2016 | Luk ........................ G06F 8/62 |

FOREIGN PATENT DOCUMENTS

| CN | 101951549 A | 1/2011 |
| CN | 103218243 A | 7/2013 |
| JP | 2003263332 A | 9/2003 |
| JP | 2003271390 A | 9/2003 |
| JP | 2009518946 A | 5/2009 |
| WO | 2012032137 A1 | 3/2012 |

* cited by examiner

APPLICATION PROGRAM UNINSTALLATION METHOD AND APPARATUS

CROSS-REFERENCE TO RELATED APPLICATIONS

This application is a national stage of International Application No. PCT/CN2015/097904, filed on Dec. 18, 2015, which claims the priority of Chinese Application No. 201410828762.0, filed on Dec. 25, 2014. Both of the aforementioned applications are hereby incorporated by reference in their entireties.

TECHNICAL FIELD

Embodiments of the present invention relate to the field of communications technologies, and in particular, to an application program uninstallation method and apparatus.

BACKGROUND

With continuous development of intelligent terminals, increasingly more application programs are developed to facilitate people's work and life. A mobile phone is used as an example. Because of limited storage space of the mobile phone, when increasingly more application programs are installed and a user cannot normally use the mobile phone, the user needs to uninstall some application programs. The user usually needs to manually uninstall the application programs, causing poor user experience and a waste of time.

In the prior art, the following two technical solutions for automatically uninstalling an application program are provided. In the first technical solution, when an application program is in a disabled state, the application program is automatically uninstalled. The disabled state of the application program means that the application program is abnormal and therefore cannot run normally. For example, a key file is lost and therefore the application program cannot work normally. In the second technical solution, when an application program is installed, a survival time of the application program on a terminal is preset, and the application program is automatically uninstalled when a preset time point arrives.

However, use scenarios of the foregoing two technical solutions for automatically uninstalling an application program are still limited. For example, when visiting a museum, a user installs a self-service tour guide application provided by the museum, and obtains an explanation service provided by the self-service tour guide application. The user needs the explanation service when visiting the museum, and does not need the explanation service any more after finishing the visit, and therefore, does not need the self-service tour guide application. In this case, the self-service tour guide application is in an enabled state, and the user cannot determine a visit time in advance. After finishing the visit, the user still needs to manually uninstall the self-service tour guide application.

SUMMARY

Embodiments of the present invention provide an application program uninstallation method and apparatus, so as to resolve a technical problem of relatively low user operation and control efficiency and relatively poor user experience that is caused when a user needs to manually uninstall an application program because solutions provided in the prior art for automatically uninstalling an application program are not applicable to some particular application scenarios.

According to a first aspect, an embodiment of the present invention provides an application program uninstallation method.

In a first possible implementation manner, the application program uninstallation method includes:
    obtaining current location information of a terminal;
    obtaining effective location information of a first application that is already installed on the terminal, where the effective location information is used for instructing the first application to provide an effective application service when the terminal is within a geographical location range corresponding to the effective location information; and
    uninstalling, by the terminal, the first application when the current location information of the terminal does not match the effective location information of the first application.

With reference to the first possible implementation manner of the first aspect, in a second possible implementation manner, the effective location information includes at least one of a longitude parameter, a latitude parameter, or an altitude parameter; and the obtaining current location information of a terminal includes:
    obtaining at least one of longitude of a current location, latitude of a current location, or altitude of a current location of the terminal; and
    the uninstalling, by the terminal, the first application when the current location information of the terminal does not match the effective location information of the first application includes:
    uninstalling, by the terminal, the first application when at least one of the longitude of the current location, the latitude of the current location, or the altitude of the current location that is obtained by the terminal does not match the effective location information.

With reference to the first possible implementation manner of the first aspect, in a third possible implementation manner, the effective geographical location information is a geographical location deviation threshold that is preset by the terminal for the first application; and before the obtaining current location information of a terminal, the method further includes:
    obtaining first-location information of the terminal; and
    the uninstalling, by the terminal, the first application when the current location information of the terminal does not match the effective location information of the first application includes:
    obtaining a first-location adjustment value, where the first-location adjustment value is a location adjustment value of a geographical location corresponding to the current location information of the terminal relative to a geographical location corresponding to the first-location information; and
    uninstalling, by the terminal, the first application when the first-location adjustment value is greater than the geographical location deviation threshold that is preset by the terminal for the first application.

With reference to any one of the first to the third possible implementation manners of the first aspect, in a fourth possible implementation manner, the uninstalling, by the terminal, the first application when the current location information of the terminal does not match the effective location information of the first application includes:
    setting, by the terminal, a first time threshold when the current location information of the terminal does not match the effective location information of the first application; and uninstalling, by the terminal, the first application when real-time location information of the terminal does not match the effective location information of the first application after the first time threshold.

With reference to any one of the first to the fourth possible implementation manners of the first aspect, in a fifth possible implementation manner, the uninstalling, by the terminal, the first application when the current location information of the terminal does not match the effective location information of the first application includes:

presenting, by the terminal, prompt information when the current location information of the terminal does not match the effective location information of the first application, where the prompt information is used for prompting a user of whether to uninstall the first application; and uninstalling the first application after the terminal obtains an instruction entered by the user for uninstalling the first application.

With reference to any one of the first to the fifth possible implementation manners of the first aspect, in a sixth possible implementation manner, the effective location information of the first application is effective location information that is preset by the user; or the effective location information of the first application is effective location information obtained by the terminal from an installation file of the first application.

According to a second aspect, an embodiment of the present invention provides an apparatus.

In a first possible implementation manner, the apparatus includes:

a first obtaining module, configured to obtain current location information of a terminal;

a second obtaining module, configured to obtain effective location information of a first application that is already installed on the terminal, where the effective location information is used for instructing the first application to provide an effective application service when the terminal is within a geographical location range corresponding to the effective location information; and an uninstallation module, configured to uninstall the first application when the current location information of the terminal does not match the effective location information of the first application.

With reference to the first possible implementation manner of the second aspect, in a second possible implementation manner, the effective location information obtained by the second obtaining module includes at least one of a longitude parameter, a latitude parameter, or an altitude parameter;

the first obtaining module is specifically configured to obtain at least one of longitude of a current location, latitude of a current location, or altitude of a current location of the terminal; and the uninstallation module is specifically configured to uninstall the first application when at least one of the longitude of the current location, the latitude of the current location, or the altitude of the current location that is obtained by the first obtaining module does not match the effective location information.

With reference to the first possible implementation manner of the second aspect, in a third possible implementation manner, the effective location information obtained by the second obtaining module is a geographical location deviation threshold that is preset by the terminal for the first application;

the apparatus further includes a third obtaining module, where the third obtaining module is configured to obtain first-location information of the terminal before the first obtaining module obtains the current location information of the terminal; and the uninstallation module is specifically configured to: obtain a first-location adjustment value, where the first-location adjustment value is a location adjustment value of a geographical location corresponding to the current location information of the terminal relative to a geographical location corresponding to the first-location information; and uninstall, by the terminal, the first application when the first-location adjustment value is greater than the geographical location deviation threshold that is preset by the terminal for the first application.

With reference to any one of the first to the third possible implementation manners of the second aspect, in a fourth possible implementation manner, the uninstallation module includes a time setting unit and a first application uninstallation unit;

the time setting unit is configured to set a first time threshold when the current location information of the terminal does not match the effective location information of the first application; and the first application uninstallation unit is configured to uninstall the first application when real-time location information of the terminal does not match the effective location information of the first application after the first time threshold.

With reference to any one of the first to the fourth possible implementation manners of the second aspect, in a fifth possible implementation manner, the uninstallation module includes an information prompt unit and a second application uninstallation unit;

the information prompt unit is configured to present prompt information when the current location information of the terminal does not match the effective location information of the first application, where the prompt information is used for prompting a user of whether to uninstall the first application; and the second application uninstallation unit is configured to uninstall the first application after an instruction entered by the user for uninstalling the first application is obtained.

According to a third aspect, an embodiment of the present invention provides a terminal.

In a first possible implementation manner, the terminal includes a processor and a memory, where the processor is connected to the memory, the memory is configured to store code, and the processor is configured to: execute the code stored in the memory, and perform the following application program uninstallation method, including:

obtaining current location information of the terminal;

obtaining effective location information of a first application that is already installed on the terminal, where the effective location information is used for instructing the first application to provide an effective application service when the terminal is within a geographical location range corresponding to the effective location information; and uninstall the first application when the current location information of the terminal does not match the effective location information of the first application.

With reference to the first possible implementation manner of the third aspect, in a second possible implementation manner, the processor is specifically configured to:

obtain at least one of longitude of a current location, latitude of a current location, or altitude of a current location of the terminal;

obtain effective location information of a first application that is already installed on the terminal, where the effective location information includes at least one of a longitude parameter, a latitude parameter, or an altitude parameter; and uninstall the first application when at least one of the longitude of the current location, the latitude of the current location, or the altitude of the current location of the terminal does not match the effective location information.

With reference to the first possible implementation manner of the third aspect, in a third possible implementation manner, the processor is specifically configured to obtain first-location information of the terminal before obtaining the current location information of the terminal;

obtain effective location information of a first application that is already installed on the terminal, where the effective geographical location information is a geographical location deviation threshold that is preset by the terminal for the first application;

obtain a first-location adjustment value, where the first-location adjustment value is a location adjustment value of a geographical location corresponding to the current location information of the terminal relative to a geographical location corresponding to the first-location information; and uninstall the first application when the first-location adjustment value is greater than the geographical location deviation threshold that is preset by the terminal for the first application.

With reference to any one of the first to the third possible implementation manners of the third aspect, in a fourth possible implementation manner, the processor is specifically configured to:

set a first time threshold when the current location information of the terminal does not match the effective location information of the first application; and uninstall the first application when real-time location information of the terminal does not match the effective location information of the first application after the first time threshold.

With reference to any one of the first to the fourth possible implementation manners of the third aspect, in a fifth possible implementation manner, the terminal further includes an output device and an input device;

the output device is configured to present prompt information when the current location information of the terminal does not match the effective location information of the first application, where the prompt information is used for prompting a user of whether to uninstall the first application;

the input device is configured to obtain an instruction entered by the user for uninstalling the first application; and the processor is specifically configured to uninstall the first application after the input device obtains the instruction entered by the user for uninstalling the first application.

In the embodiments of the present invention, it is determined whether a current location of a terminal is an effective geographical location of a first application, so as to resolve a prior-art technical problem of relatively low user operation and control efficiency that is caused because a user needs to manually uninstall an application program after installing the application. In the embodiments of the present invention, an application program is uninstalled when a current location of a terminal does not match an effective geographical location of the application program, so that user operation and control efficiency and terminal usability are improved, and user experience is improved.

BRIEF DESCRIPTION OF DRAWINGS

To describe technical solutions in embodiments of the present invention more clearly, the following briefly describes the accompanying drawings for describing the embodiments. The accompanying drawings in the following description show some embodiments of the present invention, and persons of ordinary skill in the art may still derive other drawings from these accompanying drawings without creative efforts.

DESCRIPTION OF EMBODIMENTS

To make objectives, technical solutions, and advantages of embodiments of the present invention clearer, the following describes technical solutions in embodiments of the present invention with reference to the accompanying drawings. The described embodiments are some but not all of the embodiments of the present invention. All other embodiments obtained by persons of ordinary skill in the art based on the embodiments of the present invention without creative efforts shall fall within the protection scope of the present invention.

Figure 1:
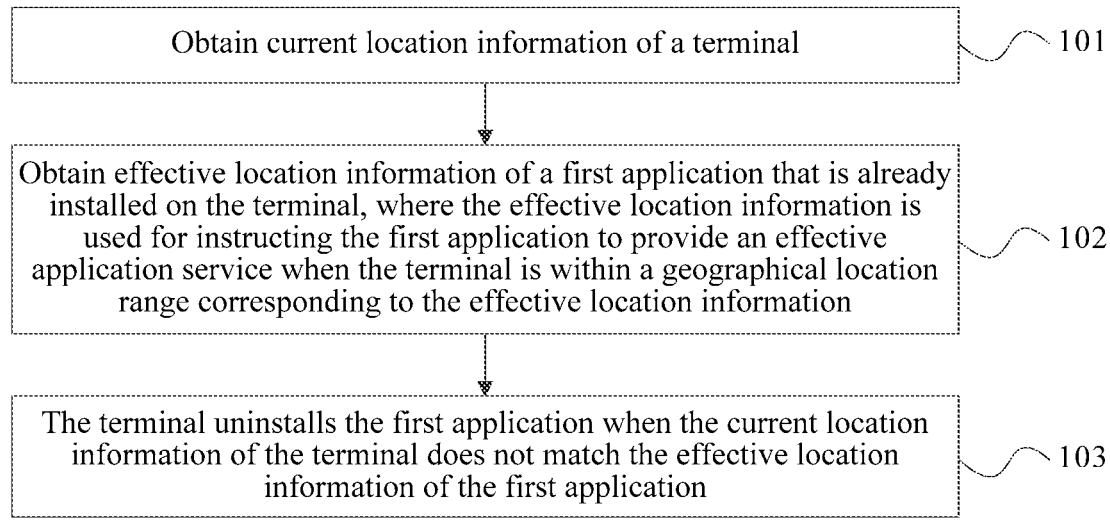
FIG. 1 is a schematic flowchart of an application program uninstallation method according to an embodiment of the present invention.

FIG. 1 is a schematic diagram of an application program uninstallation method according to an embodiment of the present invention. The method includes the following steps.

S101: Obtain current location information of a terminal.

The current location information includes current geographical location data of the terminal.

Optionally, the current geographical location data obtained by the terminal may be absolute geographical location information of the terminal, that is, longitude, latitude, altitude, or the like of a place in which the terminal is located. For example, the terminal may obtain the geographical location data by using a global navigation satellite system (GNSS), or obtain the geographical location data by using a wireless fidelity (WiFi) network, or obtain the geographical location data by using a cellular network such as the 3rd Generation Partnership Project (3GPP).

Optionally, the current geographical location data obtained by the terminal may be relative geographical location information of the terminal, that is, geographical location data of a current location of the terminal relative to a reference geographical location when a geographical location of the terminal at a previous particular moment or a previous particular location is used as a reference, such as an angle relative to the reference geographical location or a distance relative to the reference geographical location. The reference geographical location may be an installation location of a first application, or may be a cold start location of a first application.

S102: Obtain effective location information of a first application that is already installed on the terminal, where the effective location information is used for instructing the first application to provide an effective application service when the terminal is within a geographical location range corresponding to the effective location information.

The first application is installed on the terminal, and the first application provides the effective application service within the geographical location range corresponding to the effective location information. The effective application service is an application service provided by the first application during normal operation to effectively meet a service requirement of a user at a particular geographical location, and is associated with a geographical location corresponding to the effective location information. When the terminal is out of the geographical location range corresponding to the effective location information, the first application may be incapable of normally providing the application service. Alternatively, because the application service of the first application is related to a particular geographical location, the application service normally provided by the first application may be incapable of effectively meeting a user requirement, and consequently, the effective application service cannot be provided. A self-service tour guide application provided by a museum and installed on a mobile terminal of the user is used as an example. The self-service tour guide application provides, within a range of a museum area, an effective explanation service specific to a particular culture relic according to a current geographical location of the terminal. The self-service tour guide application may be incapable of providing a normal explanation service out of the range of the museum area because a culture relic at a particular geographical location cannot be positioned; or the self-service tour guide application provides a normal explanation service only specific to a particular culture relic presented on an interface of the application, and cannot meet a deep requirement of the user. The effective location information includes effective geographical location data of the first application.

Optionally, the effective geographical location data is geographical location data including a combination of parameters that represent an absolute geographical location, such as longitude, latitude, and altitude. The effective geographical location data may be particular geographical location data, and is used to represent a particular place such as 26° 38' north latitude and 107° 20' east longitude; or may be geographical location data for identifying a geographical location interval, and is used to represent a region within a specific range, for example, 20° 12' to 25° 31' north latitude and 109° 45' to 117° 20' east longitude.

When the effective location information is information that includes an absolute geographical location parameter, it is determined, according to an absolute geographical location of the terminal, whether the current location information of the terminal matches the effective location information of the first application. The absolute geographical location parameter may include at least one of the longitude, the latitude, or the altitude (which indicates a height difference between a place and a sea level), and an effective geographical location may be a particular geographical location or a particular interval location range determined according to these parameters. Two-dimensional plane space or three-dimensional stereoscopic space may be determined according to the absolute geographical location parameter. The two-dimensional space may be a regular plane figure such as a circle or a rectangle, or may be an irregular plane figure such as an irregular polygon determined by using multiple longitude and latitude coordinates. Parameters of the three-dimensional stereoscopic space include longitude, latitude, and altitude, and a two-dimensional plane formed by the longitude and the latitude may be a regular figure, or may be an irregular figure.

Optionally, the effective geographical location data is a geographical location deviation threshold preset by the terminal, that is, a maximum geographical location range value to which the terminal is allowed to adjust by using geographical location data at a particular location as a reference when the first application continuously provides the effective application service, for example, a maximum range value of two relative location changes of the terminal. The effective geographical location data includes a distance deviation threshold and an angle deviation threshold. The former is, for example, a maximum distance change value of a second location of the terminal relative to a first location, such as 500 meters. The latter is, for example, a maximum angle change value of the second location of the terminal relative to the first location, such as positive 160 degrees.

When the effective location information is the geographical location deviation threshold that is preset by the terminal for the first application, it is determined, according to a relative location of the terminal, whether a current location information of the terminal matches the effective location information of the first application. For example, it is determined whether a geographical location deviation value of a current location of the terminal relative to an installation location of the first application matches the geographical location deviation threshold that is preset by the terminal for the first application; or it is determined whether a geographical location deviation value of a current location of the terminal relative to a cold start location of the first application matches the geographical location deviation threshold that is preset by the terminal for the first application.

S103: The terminal uninstalls the first application when the current location information of the terminal does not match the effective location information of the first application.

Optionally, the current location information of the terminal includes absolute geographical location data of the terminal, such as current longitude, latitude, or altitude of a place in which the terminal is located. The effective location information of the first application includes absolute effective geographical location data of the first application, for example, location data such as longitude, latitude, and altitude at which the first application may provide the effective application service. When the absolute effective geographical location data of the first application is geographical location data of a preset interval, that the current location information of the terminal does not match the effective location information of the first application includes: current absolute geographical location data of the terminal does not fall within a range of the geographical location data of the preset interval. When the absolute effective geographical location data of the first application is geographical location data of a preset particular point, that the current location information of the terminal does not match the effective location information of the first application includes: current absolute geographical location data of the terminal is not the same as the geographical location data of the preset particular point.

For example, the effective location information includes longitude and latitude. A feature of a precise location on the Earth may be determined by using one longitude and one latitude, and an effective location of the first application may be set according to preset longitude and latitude. For example, the first application is a travel application in Guangdong province, effective location information included in an Android Packet Kit (APK) of the application is 20° 12' to 25° 31' north latitude and 109° 45' to 117° 20' east longitude. The terminal obtains current location information such as 26° 38' north latitude and 107° 20' east longitude by using a Global Positioning System (GPS), and uninstalls the first application when determining that the current location information is not within a range of the effective location information. Certainly, when the effective location information is determined by using an absolute geographical location, a specific deviation threshold may be set for each parameter during actual measurement, to avoid a misoperation.

Optionally, the current location information of the terminal includes relative geographical location data of the terminal, that is, geographical location data of a current location of the terminal relative to a reference location when a geographical location of the terminal at a previous particular moment or a previous particular location is used as a reference. The effective location information of the first application includes a preset geographical location deviation threshold, that is, a maximum geographical location threshold allowable for adjustment by using geographical location data at a particular location as a reference when the first application continuously provides the effective application. That the current location information of the terminal does not match the effective location information of the first application includes: a geographical location adjustment value corresponding to the relative geographical location data of the terminal is greater than the preset geographical location deviation threshold of the first application.

In this embodiment of the present invention, it is determined whether a current location of a terminal is an effective geographical location of a first application, so as to resolve a prior-art technical problem of relatively low user operation and control efficiency that is caused because a user needs to manually uninstall an application program after installing the application. In this embodiment of the present invention, an application program is uninstalled when a current location of a terminal does not match an effective geographical location of the application program, so that user operation and control efficiency and terminal usability are improved, and user experience is improved.

Figure 2:
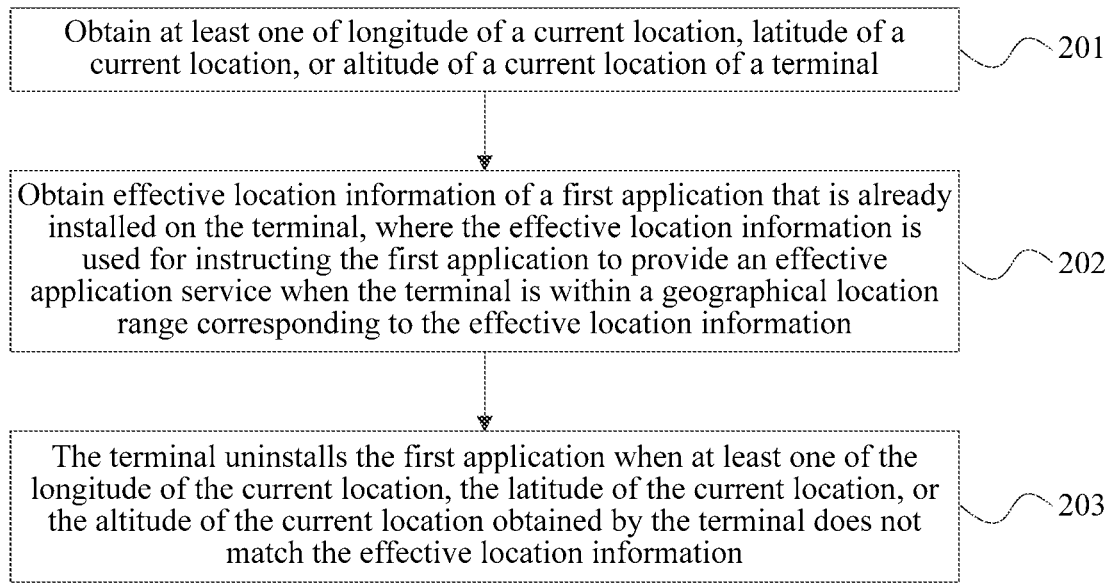
FIG. 2 is a schematic flowchart of an application program uninstallation method according to an embodiment of the present invention.

In an embodiment of the present invention, as shown in FIG. 2, the effective location information includes an absolute geographical location parameter, that is, at least one of a longitude parameter, a latitude parameter, or an altitude parameter. The foregoing S101 may be replaced with S201: A terminal obtains at least one of longitude of a current location, latitude of a current location, or altitude of a current location of the terminal. The foregoing S103 may be replaced with S203: The terminal uninstalls the first application when at least one of the longitude of the current location, the latitude of the current location, or the altitude of the current location does not match the effective location information.

Specifically, the effective location information includes any one, two, or three of the longitude parameter, the latitude parameter, or the altitude parameter. Correspondingly, the terminal may obtain one, two, or three of current longitude, current latitude, or current altitude. For example, the effective information includes the longitude parameter and the latitude parameter. The terminal obtains the current longitude and the current latitude, and uninstalls the first application when one of the current longitude and the current latitude of the terminal does not match the effective information. For example, the effective information includes the longitude parameter, the latitude parameter, and the altitude parameter. The terminal obtains the current longitude, the current latitude, and the current altitude, and uninstalls the first application when one of the current longitude, the current latitude, or the current altitude of the terminal does not match the effective information.

Figure 3:
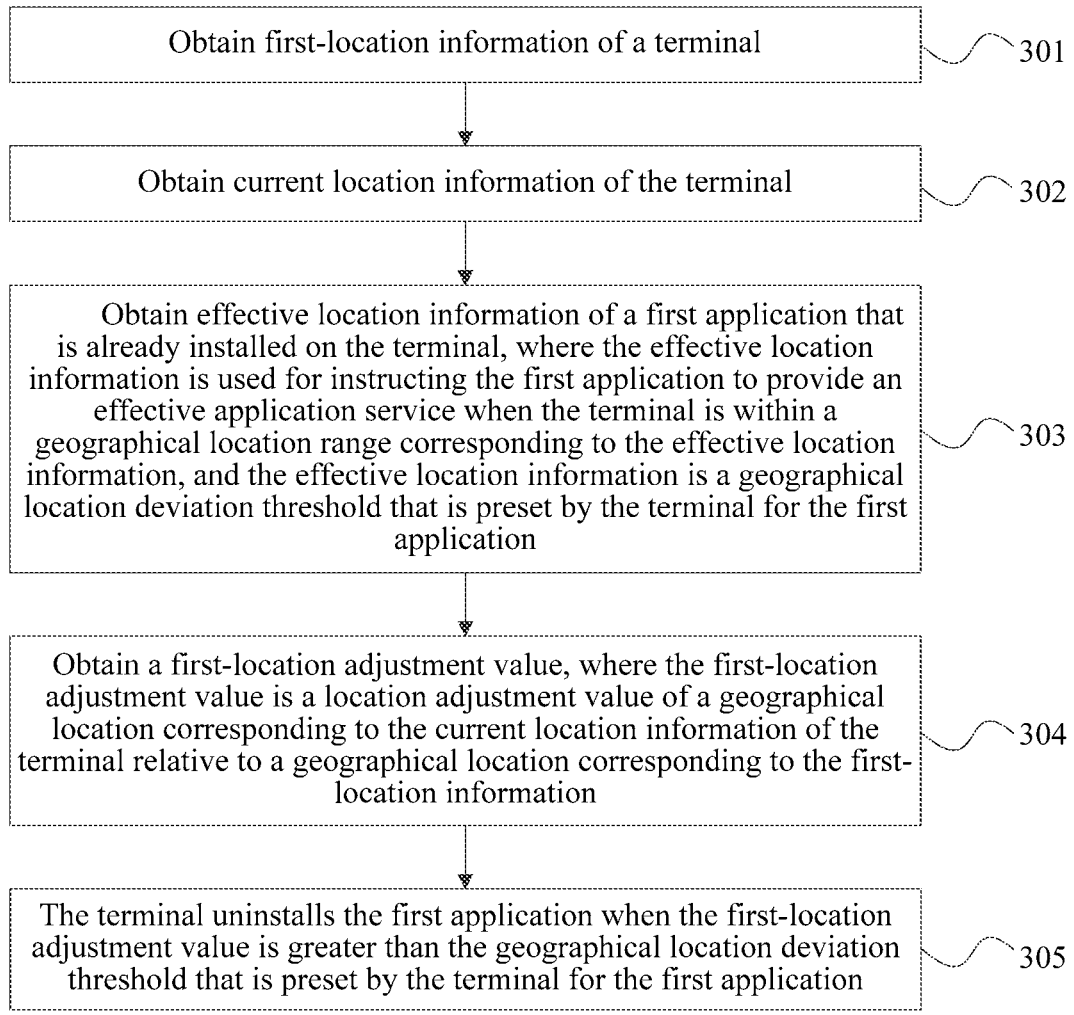
FIG. 3 is a schematic flowchart of an application program uninstallation method according to an embodiment of the present invention.

In an embodiment of the present invention, as shown in FIG. 3, the effective geographical location information is a geographical location deviation threshold that is preset by the terminal for the first application. Before S302 of obtaining, by the terminal, current location information, the method further includes S301: The terminal obtains first-location information, where the first location is a reference location relative to a current location of the terminal, and the first location may be specifically a geographical location at which the first application is installed on the terminal or a geographical location at which the terminal performs cold start on the first application.

S304: The terminal obtains a first-location adjustment value, where the first-location adjustment value is a location adjustment value of a geographical location corresponding to the current location information of the terminal relative to a geographical location corresponding to the first-location information, and the first-location adjustment value may include a first-location angle adjustment value or a first-location distance adjustment value. The former is used to indicate a moving angle of the current location of the terminal relative to the first-location, and the latter is used to indicate a moving distance of the current location of the terminal relative to the first-location.

S305: The terminal uninstalls the first application when the first-location adjustment value is greater than the geographical location deviation threshold that is preset by the terminal for the first application.

Optionally, the preset geographical location deviation threshold of the first application includes at least one of a preset angle deviation threshold of the first application or a preset distance deviation threshold of the first application. The terminal determines the first-location adjustment value and the preset geographical location deviation value of the first application. When the first-location adjustment value is greater than the preset geographical location deviation threshold of the first application, it indicates that a location change value of the terminal exceeds a location change value predetermined for the first application, and the terminal uninstalls the first application.

That the first-location adjustment value is greater than the preset geographical location deviation threshold of the first application includes: the first-location angle adjustment value is greater than the preset angle deviation threshold of the first application; the first-location distance deviation value is greater than the preset distance deviation threshold of the first application; or the first-location angle adjustment value is greater than the preset angle deviation threshold of the first application, and the first-location distance deviation value is greater than the preset distance deviation threshold of the first application.

In this embodiment of the present invention, relative geographical location information of a current location of a terminal relative to a first location is determined, to determine whether geographical location movement of the terminal exceeds a preset threshold, so that a user can determine whether to delete a first application program according to a preset distance deviation threshold, the terminal meets a user requirement more intelligently, and user experience is improved.

Figure 4:
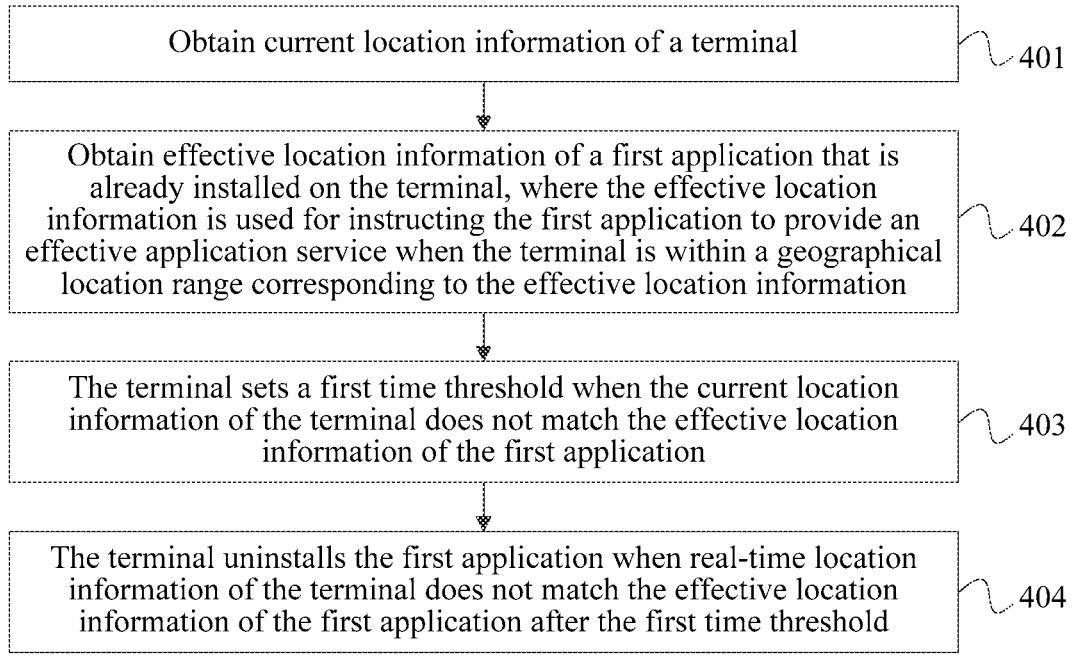
FIG. 4 is a schematic flowchart of an application program uninstallation method according to an embodiment of the present invention.

In the foregoing embodiment of the present invention, as shown in FIG. 4, when the current location information of the terminal does not match the effective location information of the first application, the terminal may set a time threshold. The terminal uninstalls the first application when real-time location information of the terminal does not match the effective location information of the first application either after the time threshold. That is:

S403: The terminal sets a first time threshold when the current location information of the terminal does not match the effective location information of the first application.

The first time threshold may be a particular time period such as three days; or may be a non-particular time period, for example, when a date is set to a last day of a current month or a last day of a current year, the first time threshold is corresponding to a period of time from a current date to the last day of the current month or the last day of the current year. The first time threshold may be set in a terminal system by default, or may be set by a user according to a requirement.

S404: The terminal uninstalls the first application when real-time location information of the terminal does not match the effective location information of the first application after the first time threshold.

The real-time location information is geographical location information of the terminal that is obtained by the terminal in real time after the first time threshold. Specifically, the following cases may be included: Optionally, the first time threshold is a particular time period, and the first application is uninstalled when the real-time location information of the terminal does not match the effective location information of the first application after the particular time period. Optionally, the first time threshold is a non-particular time period from a current date to a particular date, and the first application is uninstalled when the real-time location information of the terminal does not match the effective location information of the first application upon arrival of the particular date.

A self-service tour guide application of a museum is used as an example. The self-service tour guide application is installed on a mobile phone of a user, an effective location is a museum area, and the self-service tour guide application provides an explanation service within a range of the museum area. When the user goes out for dining at noon, the mobile phone detects that current location information does not match effective location information, and uninstalls the self-service tour guide application. However, after the dining, the user may go back to the museum area for visiting, and in this case, the self-service tour guide application needs to be installed again. In this embodiment, the user sets a time threshold such as one day on the mobile phone. When the user determines that the current location information does not match the effective location information, the mobile phone sets the time threshold of one day. After one day starting from a current moment, when real-time location information of the mobile phone does not match museum area information, the mobile phone uninstalls the self-service tour guide application.

Whether the real-time location information of the terminal matches the effective location information of the first application within the particular time period is not limited in this embodiment. In an optional implementation manner, when the current location information of the terminal does not match the effective location information of the first application for the first time, the terminal sets the first time threshold. Within a time period corresponding to the first time threshold, after the terminal detects that the real-time location information of the terminal matches the effective location information of the first application, and when the terminal detects, for the second time, that the current location information of the terminal does not match the effective location information of the first application, the terminal may set a time point of the second time of mismatch as a start point of a second time threshold. The terminal uninstalls the first application when the real-time location information of the terminal does not match the effective location information of the first application after a time period corresponding to the second time threshold.

The foregoing self-service tour guide application of a museum is still used as an example. A user visits the museum in the morning, and the self-service tour guide application is installed on a mobile phone. When the user goes out for dining at noon, the mobile phone detects that current location information does not match effective location information, and sets a first time threshold such as one day. After one day starting from a time point at which it is detected that the current location information does not match the effective location information, if real-time location information of the terminal does not match the effective location information of the self-service tour guide application, the mobile phone uninstalls the self-service tour guide application. After the dining, the user goes back to a museum area for visiting in the afternoon, and the mobile phone detects that current geographical location information matches the effective location information of the self-service tour guide application. In this case, the mobile phone has the following two options: The first option is to continue to calculate the first time threshold, that is, the time point of information mismatch during dining out at noon is still used as a start point for calculating duration of one day, and the self-service tour guide application is uninstalled when it is detected that real-time location information of the mobile phone does not match the effective location information after one day. The second option is that the mobile phone resets the first time threshold, that is, the time point of information mismatch during dining out at noon is not used as a start point for calculating duration of one day any more. The mobile phone continues to perform the foregoing method. When the mobile phone detects, for the second time, that current location information does not match the effective location information of the first application, for example, the user goes home in the evening after finishing the visit, the mobile phone sets a second time threshold such as two days by using a time point at which information mismatch is detected for the second time as a calculation start point, and the self-service tour guide application is uninstalled when it is detected that real-time location information of the mobile phone does not match the effective location information after two days. If the mobile phone detects again that current location information matches the effective location information within a time period corresponding to the second time threshold, the mobile phone may still use a time point of information mismatch that appears after the information match as a calculation start point, to set a third time threshold, and repeat the foregoing operation. Time periods corresponding to the first time threshold, the second time threshold, and the third time threshold may be the same, or may present a progressive increase trend.

Specifically, the terminal may obtain relative motion path information and relative location information of the terminal by using a sensor such as an accelerometer, a gyroscope, or a magnetometer. For example, for a pedestrian dead reckoning (PDR) or an inertial navigation system (INS), in the former, information such as a walking track and a location of a pedestrian is reckoned by measuring and counting a quantity of steps, a step length, and a direction of the pedestrian; in the latter, by using measurement data of sensors such as a gyroscope and an accelerometer, motion of a carrier in an inertial reference coordinate system is determined and a location of the carrier in the inertial reference coordinate system is calculated.

According to this embodiment of the present invention, a time threshold is set, so that a terminal does not delete a first application when detecting that current location information does not match effective location information, a misoperation of the terminal is prevented, elasticity for application uninstallation is provided for a user, and user experience and terminal usability are improved.

Figure 5:
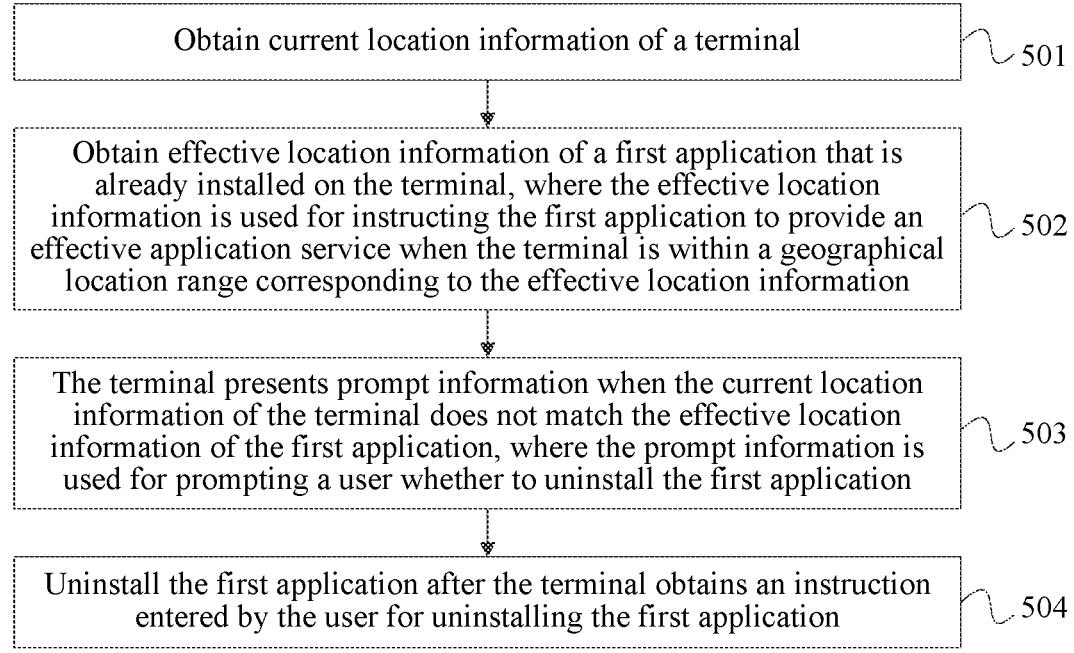
FIG. 5 is a schematic flowchart of an application program uninstallation method according to an embodiment of the present invention.

In an embodiment of the present invention, as shown in FIG. 5, step S103 in FIG. 1 may include steps S503 and S504 in FIG. 5.

S503: The terminal presents prompt information when the current location information of the terminal does not match the effective location information of the first application, where the prompt information is used for prompting a user whether to uninstall the first application.

Specifically, the prompt information may be prompt information presented by using a dialog box on a user interface of the terminal, or may be a sound prompt, or may be a vibration prompt of the terminal. The prompt information is intended to draw attention from the user, to determine whether to uninstall the first application.

S504: Uninstall the first application after the terminal obtains an instruction entered by the user for uninstalling the first application.

Specifically, after learning the prompt information presented by the terminal, the user enters a confirmation instruction for confirming uninstallation of the first application, for example, clicking a confirmation button on the user interface. After obtaining the instruction entered by the user for confirming uninstallation, the terminal uninstalls the first application.

In this embodiment of the present invention, prompt information is set for confirmation by a user, so that a misoperation that appears when a terminal directly uninstalls an application program during information mismatch is avoided, accuracy of application uninstallation is improved, and user experience is improved.

In the foregoing embodiments of the present invention, before obtaining effective location information of a first application, a terminal may set the effective location information of the first application in at least the following manners: First, the effective location information of the application program is preset in an installation package APK of the first application, and the terminal extracts and records the effective location information of the first application when installing the first application according to the APK. Second, the effective location information of the application program is not preset in an installation package APK of the first application, and after installing the first application according to the APK of the first application, the terminal may present a geographical location confirmation option on an application interface of the first application when initializing the first application, where the geographical location confirmation option is used by the user to determine the effective geographical location information of the application program and determine a corresponding geographical location range. Third, the effective location information of the application program is not preset in an installation package APK of the first application, but other attribute information, such as attribute information indicating that the first application is a regional application, is set in the APK, and the terminal determines the effective location information of the first application according to the attribute information.

FIG. 6 to FIG. 9 show apparatuses provided in embodiments of the present invention, and the apparatuses are configured to perform the foregoing application program uninstallation methods. An apparatus shown in FIG. 6 may be configured to perform the method described in FIG. 1. The apparatus includes: a first obtaining module 601, a second obtaining module 602, and a third obtaining module 603. The first obtaining module 601 is configured to obtain current location information of a terminal. The second obtaining module 602 is configured to obtain effective location information of a first application that is already installed on the terminal, where the effective location information is used for instructing the first application to provide an effective application service when the terminal is within a geographical location range corresponding to the effective location information. The uninstallation module 603 is configured to uninstall the first application when the current location information of the terminal does not match the effective location information of the first application.

Figure 6:
FIG. 6 is a schematic structural diagram of an apparatus according to an embodiment of the present invention.

The apparatus described in FIG. 6 may be further configured to perform the method described in FIG. 2. The first obtaining module is specifically configured to obtain at least one of longitude of a current location, latitude of a current location, or altitude of a current location of the terminal. The effective location information obtained by the second obtaining module includes at least one of a longitude parameter, a latitude parameter, or an altitude parameter. The uninstallation module is specifically configured to uninstall, by the terminal, the first application when at least one of the longitude of the current location, the latitude of the current location, or the altitude of the current location that is obtained by the first obtaining module does not match the effective location information.

Figure 7:
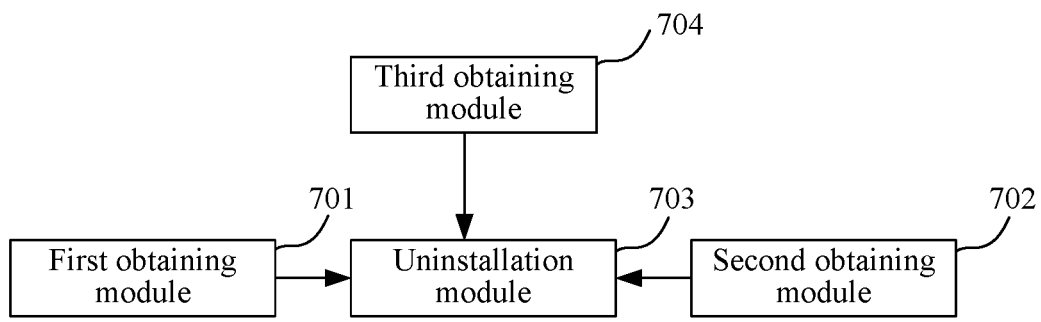
FIG. 7 is a schematic structural diagram of an apparatus according to an embodiment of the present invention.

An apparatus described in FIG. 7 may be configured to perform the method described in FIG. 3. The apparatus includes a first obtaining module 701, a second obtaining module 702, a third obtaining module 704, and an uninstallation module 703. The third obtaining module 704 is configured to obtain first-location information of the terminal before the first obtaining module 701 obtains current location information of the terminal. Effective location information obtained by the second obtaining module 702 is a geographical location deviation threshold that is preset by the terminal for the first application. The uninstallation module 703 is specifically configured to: obtain a first-location adjustment value, where the first-location adjustment value is a location adjustment value of a geographical location corresponding to the current location information of the terminal relative to a geographical location corresponding to the first-location information; and uninstall the first application when the first-location adjustment value is greater than the geographical location deviation threshold that is preset by the terminal for the first application.

Figure 8:
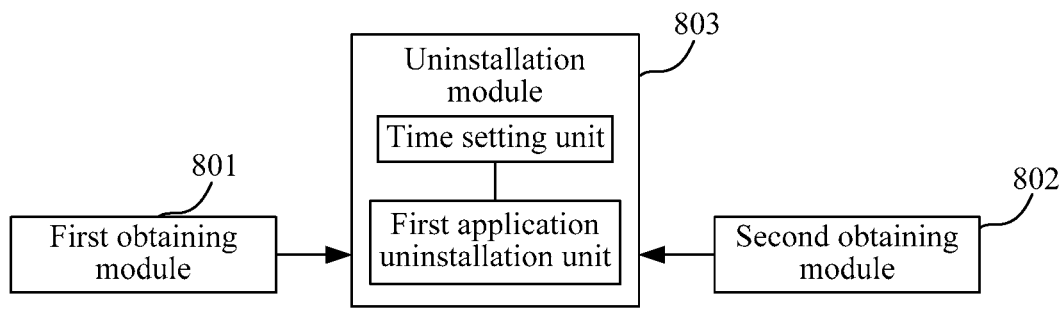
FIG. 8 is a schematic structural diagram of an apparatus according to an embodiment of the present invention.

An apparatus described in FIG. 8 may be configured to perform the method in FIG. 4. The apparatus includes: a first obtaining module 801, a second obtaining module 802, and an uninstallation module 803. The uninstallation module 803 includes a time setting unit and a first application uninstallation unit. The time setting unit is configured to set a first time threshold when the current location information of the terminal does not match the effective location information of the first application. The first application uninstallation unit is configured to uninstall the first application when real-time location information of the terminal does not match the effective location information of the first application after the first time threshold.

Figure 9:
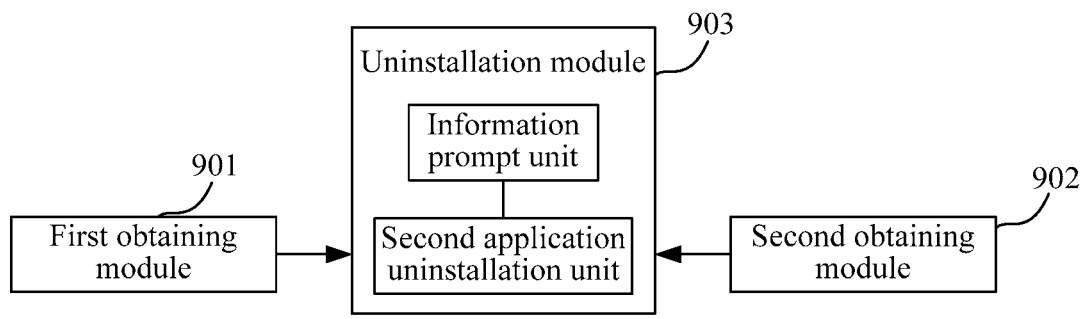
FIG. 9 is a schematic structural diagram of an apparatus according to an embodiment of the present invention.

An apparatus described in FIG. 9 may be configured to perform the method described in FIG. 5. The apparatus includes: a first obtaining module 901, a second obtaining module 902, and an uninstallation module 903. The uninstallation module 903 includes an information prompt unit and a second application uninstallation unit. The information prompt unit is configured to present prompt information when the current location information of the terminal does not match the effective location information of the first application, and the prompt information is used for prompting a user of whether to uninstall the first application. The second application uninstallation unit is configured to uninstall the first application after an instruction entered by the user for uninstalling the first application is obtained.

Figure 10:
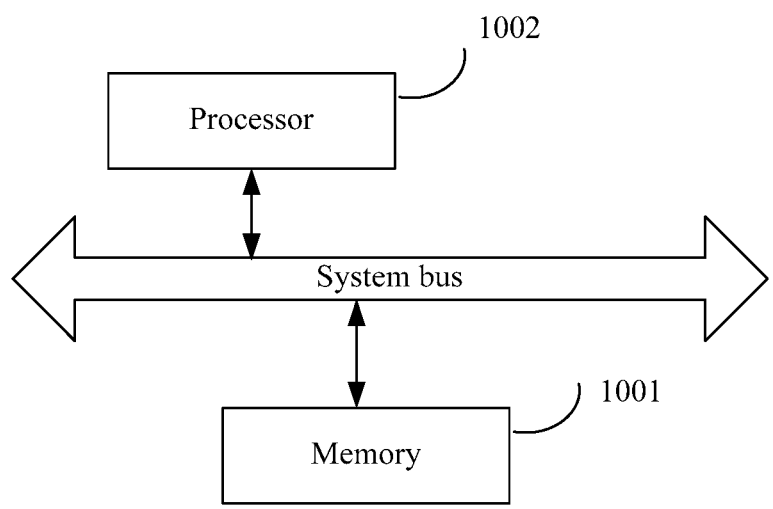
FIG. 10 is a schematic structural diagram of a terminal according to an embodiment of the present invention.
Figure 11:
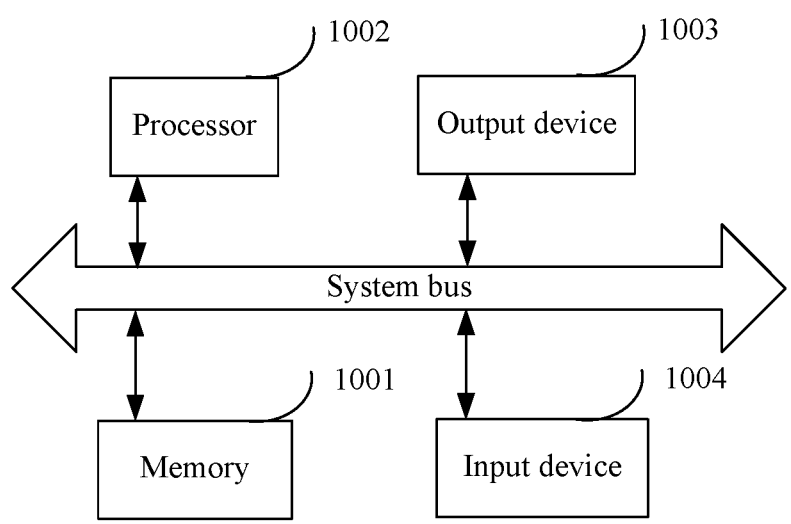
FIG. 11 is a schematic structural diagram of a terminal according to an embodiment of the present invention.

FIG. 10 and FIG. 11 are terminals provided in embodiments of the present invention, and the terminals are configured to perform the foregoing application program uninstallation methods. A terminal shown in FIG. 10 may be configured to perform the method described in FIG. 1. The terminal includes a processor 1002 and a memory 1001. The processor 1002 is connected to the memory 1001 by using a system bus, the memory 1001 is configured to store code, and the processor 1002 is configured to execute the code stored in the memory 1001. Specifically, the processor 1002 is configured to: obtain current location information of a terminal; obtain effective location information of a first application that is already installed on the terminal, where the effective location information is used for instructing the first application to provide an effective application service when the terminal is within a geographical location range corresponding to the effective location information; and uninstall the first application when the current location information of the terminal does not match the effective location information of the first application.

The terminal described in FIG. 10 may be further configured to perform the method described in FIG. 2. The processor is specifically configured to: obtain at least one of longitude of a current location, latitude of a current location, or altitude of a current location of the terminal; obtain effective location information of a first application that is already installed on the terminal, where the effective location information includes at least one of a longitude parameter, a latitude parameter, or an altitude parameter; and uninstall the first application when at least one of the longitude of the current location, the latitude of the current location, or the altitude of the current location of the terminal does not match the effective location information.

The terminal described in FIG. 10 may be further configured to perform the method described in FIG. 3. The processor is specifically configured to: obtain first-location information of the terminal before obtaining the current location information of the terminal; obtain effective location information of a first application that is already installed on the terminal, where the effective geographical location information is a geographical location deviation threshold that is preset by the terminal for the first application; obtain a first-location adjustment value, where the first-location adjustment value is a location adjustment value of a geographical location corresponding to the current location information of the terminal relative to a geographical location corresponding to the first-location information; and uninstall the first application when the first-location adjustment value is greater than the geographical location deviation threshold that is preset by the terminal for the first application.

The terminal described in FIG. 10 may be further configured to perform the method described in FIG. 4. The processor is specifically configured to: set a first time threshold when the current location information of the terminal does not match the effective location information of the first application; and uninstall the first application when real-time location information of the terminal does not match the effective location information of the first application after the first time threshold.

A terminal described in FIG. 11 may be configured to perform the method described in FIG. 5. The terminal includes a memory 1001, a processor 1002, an output device 1003, and an input device 1004. The memory 1001, the processor 1002, the output device 1003, and the input device 1004 are connected by using a system bus. The output device 1003 is configured to present prompt information when the current location information of the terminal does not match the effective location information of the first application, where the prompt information is used for prompting a user of whether to uninstall the first application;

the input device 1004 is configured to obtain an instruction entered by the user for uninstalling the first application; and the processor 1002 is specifically configured to uninstall the first application after the input device obtains the instruction entered by the user for uninstalling the first application.

In the foregoing terminal embodiments of the present invention, the processor is a control center of the terminal, connects all parts of the entire terminal by using various interfaces and lines, and performs various functions of the mobile terminal and/or processes data by running or executing software programs and/or modules that are stored in the memory and invoking data stored in the memory. The processor includes an integrated circuit (IC), and may be, for example, formed by a single packaged IC, or may be formed by connecting multiple packaged ICs with a same function or different functions. For example, the processor may include only a central processing unit (CPU), or may be a combination of a graphics processing unit (GPU), a digital signal processor (DSP), and a control chip (such as a baseband chip) in a communication management module. In an implementation manner of the present invention, the CPU may be a single computing core or may include multiple computing cores.

The memory may be configured to store software program settings and system settings. The processor executes various functional applications of the mobile terminal and processes data by reading the software program configuration and the system configuration that are stored in the memory. The memory includes a program setting storage area and a system setting storage area. The program configuration storage area may store configuration information of at least one application program such as a sound play program or an image play program. The system storage area may store system configuration data created according to use of the mobile terminal. In a specific implementation manner of the present invention, the memory may include a volatile memory, such as a nonvolatile dynamic random access memory (NVRAM), a phase change random access memory (Phase Change RAM, PRAM), or a magnetoresistive random access memory (Magnetoresistive RAM, MRAM), or may include a nonvolatile memory, such as at least one magnetic storage component, an electrically erasable programmable read-only memory (EEPROM), or a flash memory, for example, a NOR flash memory or a NAND flash memory. The nonvolatile memory stores an operating system and an application program that are executed by the processor. The processor loads a running program and data from the nonvolatile memory to a memory, and saves digital content in a large-scale storage apparatus. The operating system is used for controlling and managing regular system tasks, such as memory management, storage device control, and power management, and various components and/or drivers that facilitate communication between various types of software and hardware. In an implementation manner of the present invention, the operating system may be an Android system of Google, an iOS system developed by Apple, a Windows operating system developed by Microsoft, or the like, or may be an embedded operating system such as Vxworks. The operating system is not limited in this embodiment of the present invention.

The input device is configured to implement interaction between a user and a terminal and/or input information to the terminal. For example, the input device may receive number or character information entered by the user, to generate signal input related to a user setting or function control. In a specific implementation manner of the present invention, the input device may be a touch panel, or may be another human-computer interaction interface such as a physical input key or a microphone, or may be another external information capturing apparatus such as a camera. The touch panel is also referred to as a touchscreen or a touch control screen, and can collect an operation action of the user of touching or approaching the touch panel, for example, an operation action of the user on the touch panel or at a position near the touch panel by using any suitable object or accessory such as a finger or a stylus, and a corresponding connection apparatus is driven according to a preset program. Optionally, the touch panel may include two parts: a touch detection apparatus and a touch controller. The touch detection apparatus detects a touch operation of the user, converts the detected touch operation into an electrical signal, and transfers the electrical signal to the touch controller. The touch controller receives the electrical signal from the touch detection apparatus, converts the electrical signal into touch point coordinates, and further transfers the touch point coordinates to a processing unit in a storage and processing module. The touch controller may further receive a command sent by the processor, and execute the command. In addition, the touch panel may be implemented in multiple types such as resistive, capacitive, infrared, and surface acoustic wave. In another implementation manner of the present invention, the physical input key used by the input device may include but is not limited to one or more of a physical keyboard, a functional key (such as a volume control key or a switch key), a trackball, a mouse, and a joystick. The input module in a form of a microphone may collect a voice input by the user or an environment, and convert the voice into a command that is in a form of an electric signal and that can be executed by the processing unit. In some other implementation manners of the present invention, the input device may be various sensing components such as a Hall component, and is configured to: detect a physical quantity of the mobile terminal, such as force, torque, pressure, stress, a location, an offset, a speed, an acceleration, an angle, an angular velocity, a quantity of revolutions, a rotational speed, or a time at which a working state changes, and convert the physical quantity into an electric quantity for detection and control. Some other sensing devices may include a gravity sensor, a tri-axis accelerometer, a gyroscope, and the like.

The output device includes but is not limited to an image output module and a sound output module. The image output module is configured to output a text, a picture, and/or a video. The image output module may include a display panel such as a display panel configured by using an LCD (liquid crystal display), an OLED (organic light-emitting diode), a field emission display (FED), or the like. Alternatively, the image output module may include a reflective display, for example, an electrophoretic display, or a display using a technology of interferometric modulation of light. The image output module may include a single display or multiple displays of different sizes. In a specific implementation manner of the present invention, the touch panel used in the input device may also be used as a display panel of the output device. For example, after detecting a gesture operation of touching or approaching the touch panel, the touch panel transmits the gesture operation to the processing unit to determine a type of a touch event, and subsequently, the processing unit provides corresponding visual output on the display panel according to the type of the touch event. Although in FIG. 1, the input module and the output module implement input and output functions of the mobile terminal as two independent parts, in some embodiments, the touch panel and the display panel may be integrated as one to implement the input and output functions of the mobile terminal. For example, the image output module may display various graphical user interfaces (GUI), to be used as a virtual control element, which includes but is not limited to a window, a scroll, an icon, and a scrapbook, so that a user performs an operation in a touch control manner.

Functional modules in the embodiments of the present invention may be integrated into one processing unit module, or each of the modules may exist alone physically, or two or more modules are integrated into one module. The integrated module may be implemented in the form of hardware, or may be implemented in the form of hardware in addition to a software functional unit.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing device, reference may be made to the corresponding process in the method embodiments.

Implementation principles and technical effects thereof are similar, and for the same or corresponding technical feature, details are not described herein.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention. Additionally, statements made herein characterizing the invention refer to an embodiment of the invention and not necessarily all embodiments.

What is claimed is:

1. An application program uninstallation method comprising:
obtaining, by a terminal, current location information of the terminal, wherein the terminal is in wireless communications with a source of the current location information;
determining, by the terminal, whether the current location information of the terminal is within an effective geographic region of a first application installed on the terminal,
wherein the effective geographic region of the first application is a geographic region within which the first application provides an application service, and wherein determining whether the current location of the terminal is within the effective geographical region includes determining a change in altitude with respect to a reference altitude;
presenting, by the terminal, prompt information in response to determining that the current location information of the terminal is outside the effective geographic region of the first application for a predetermined amount of time, wherein the prompt information is for prompting a user to provide an instruction regarding whether or not to uninstall the first application;
uninstalling, by the terminal, the first application after the terminal obtains an instruction from the user to uninstall the first application; and
automatically and incrementally increasing the predetermined amount of time when the terminal returns within the effective geographic region before expiration of the predetermined amount of time.

2. The method according to claim 1, wherein the effective geographic region of the first application comprises a longitude parameter, a latitude parameter, and an altitude parameter;
wherein obtaining the current location information of the terminal comprises obtaining longitude, latitude, and altitude corresponding to the current location of the terminal; and
wherein the current location information of the terminal is determined to be outside the effective geographic region of the first application if the longitude, the latitude, and the altitude of the current location do not match the longitude parameter, the latitude parameter, and the altitude parameter.

3. The method according to claim 1, wherein the effective geographic region of the first application comprises a geographical location deviation threshold that is preset by the terminal for the first application;
wherein, before obtaining the current location information of the terminal, the method further comprises:
obtaining first-location information of the terminal;
wherein determining whether the current location information of the terminal is within the effective geographic region of the first application comprises:
obtaining a first-location adjustment value, wherein the first-location adjustment value is a location adjustment value of a geographical location corresponding to the current location information of the terminal relative to a geographical location corresponding to the first-location information; and
wherein the current location information of the terminal is determined to be outside the effective geographic region of the first application if the first-location adjustment value is greater than the geographical location deviation threshold that is preset by the terminal for the first application.

4. The method according to claim 1, wherein the effective geographic region is preset by the user or obtained by the terminal from an installation file of the first application.

5. A terminal comprising:
a memory having processor-executable instructions stored thereon; and
a processor, connected to the memory, wherein the processor is configured to execute the processor-executable instructions to facilitate the following:
obtaining current location information of the terminal;
determining whether the current location information of the terminal is within an effective geographic region of a first application,
wherein the effective geographic region of the first application is a geographic region within which the first application provides an application service, and wherein determining whether the current location of the terminal is within the effective geographical region includes determining a change in altitude with respect to a reference altitude;
presenting, by the terminal, prompt information in response to determining that the current location information of the terminal is outside the effective geographic region the first application for a predetermined amount of time, wherein the prompt information is for prompting a user to provide an instruction regarding whether or not to uninstall the first application;
uninstalling, by the terminal, the first application after the terminal obtains an instruction from the user to uninstall the first application; and
automatically and incrementally increasing the predetermined amount of time when the terminal returns within the effective geographic region before expiration of the predetermined amount of time.

6. The terminal according to claim 5, wherein the effective geographic region of the first application comprises a longitude parameter, a latitude parameter, and an altitude parameter;
wherein obtaining the current location information of the terminal comprises obtaining longitude, latitude, and altitude corresponding to the current location of the terminal; and
wherein the current location information of the terminal is determined to be outside the effective geographic region of the first application if the longitude, the latitude, and the altitude of the current location do not match the longitude parameter, the latitude parameter, and the altitude parameter.

7. The terminal according to claim 5, wherein the effective geographic region of the first application comprises a geographical location deviation threshold that is preset by the terminal for the first application;
wherein the processor is further configured to execute the processor-executable instructions to facilitate obtaining first-location information of the terminal before obtaining the current location information of the terminal;
wherein determining whether the current location information of the terminal is within the effective geographic region of the first application comprises obtaining a first-location adjustment value, wherein the first-location adjustment value is a location adjustment value of a geographical location corresponding to the current location information of the terminal relative to a geographical location corresponding to the first-location information; and wherein the current location information of the terminal is determined to be outside the effective geographic region of the first application if the first-location adjustment value is greater than the geographical location deviation threshold that is preset by the terminal for the first application.

8. A non-transitory computer-readable medium having processor-executable instructions stored thereon for application program uninstallation, the processor-executable instructions, when executed, facilitating performance of the following:

obtaining current location information of a terminal;

determining whether the current location information of the terminal is within an effective geographic region of a first application installed on the terminal,
wherein the effective geographic region of the first application is a geographic region within which the first application provides an application service, and wherein determining whether the current location of the terminal is within the effective geographical region includes determining a change in altitude with respect to a reference altitude;

presenting, by the terminal, prompt information uninstalling the first application in response to determining that the current location information of the terminal is outside the effective geographic region of the first application for a predetermined amount of time, wherein the prompt information is for prompting a user to provide an instruction regarding whether or not to uninstall the first application;

uninstalling, by the terminal, the first application after the terminal obtains an instruction from the user to uninstall the first application; and automatically and incrementally increasing the predetermined amount of time when the terminal returns within the effective geographic region before expiration of the predetermined amount of time.

9. The non-transitory computer-readable medium according to claim 8, wherein the effective geographic region of the first application comprises a longitude parameter, a latitude parameter, and an altitude parameter;

wherein obtaining the current location information of the terminal comprises obtaining longitude, latitude, and altitude corresponding to the current location of the terminal; and wherein the current location information of the terminal is determined to be outside the effective geographic region of the first application if the longitude, the latitude, and the altitude of the current location do not match the longitude parameter, the latitude parameter, and the altitude parameter.

10. The non-transitory computer-readable medium according to claim 8, wherein the effective geographic region of the first application comprises a geographical location deviation threshold that is preset by the terminal for the first application;

wherein the processor-executable instructions, when executed, further facilitate: before obtaining the current location information of the terminal, obtaining first-location information of the terminal;

wherein determining whether the current location information of the terminal is within the effective geographic region of the first application comprises: obtaining a first-location adjustment value, wherein the first-location adjustment value is a location adjustment value of a geographical location corresponding to the current location information of the terminal relative to a geographical location corresponding to the first-location information; and wherein the current location information of the terminal is determined to be outside the effective geographic region of the first application if the first-location adjustment value is greater than the geographical location deviation threshold that is preset by the terminal for the first application.

* * * * *